June 12, 1923.
R. M. LOVEJOY
ELEVATING TRUCK
Filed March 1, 1919
1,458,534
2 Sheets-Sheet 1
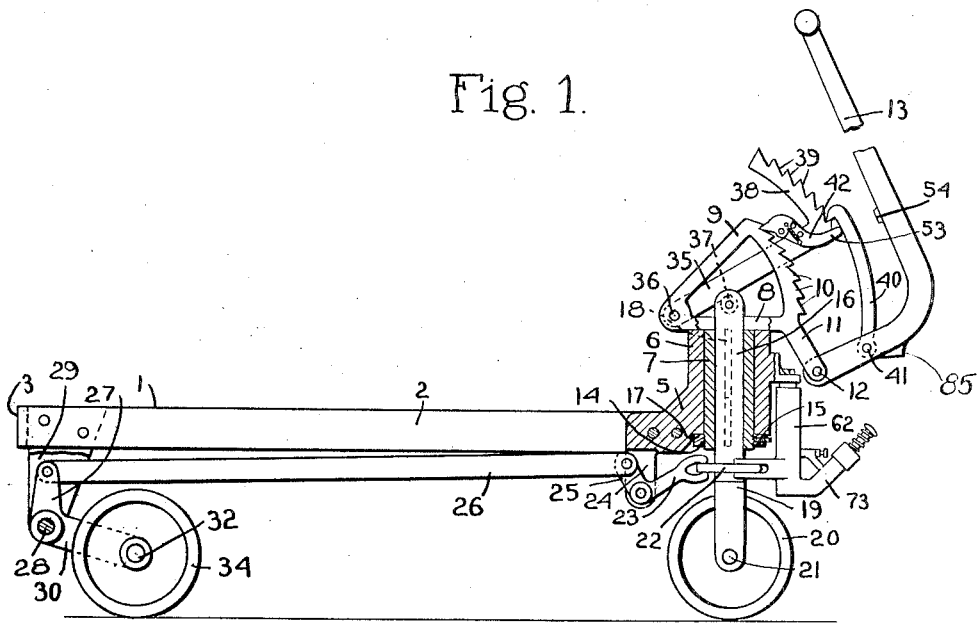
Fig. 1.
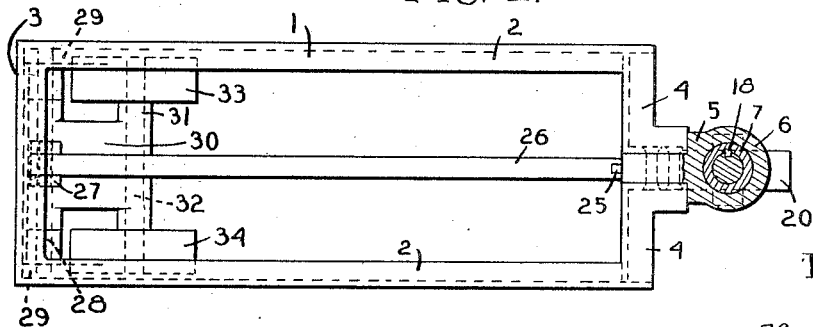
Fig. 2.
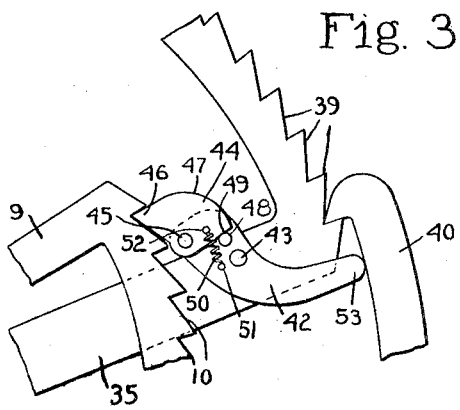
Fig. 3.
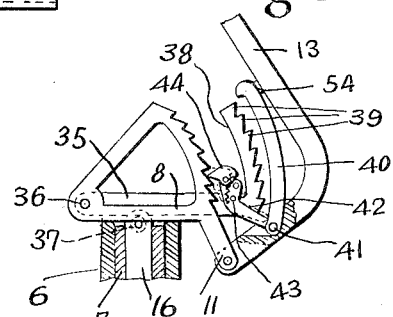
Fig. 3.ᴬ
Inventor.
Ralph M. Lovejoy
by Heard Smith & Tennant
Attys.

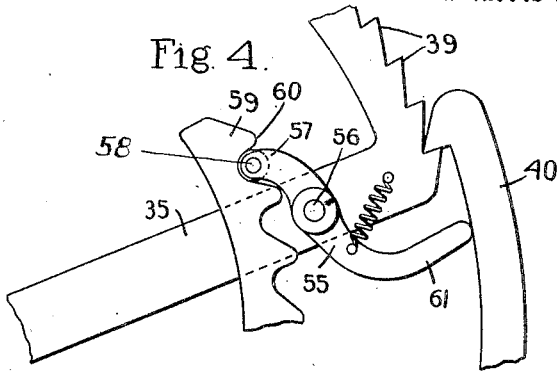
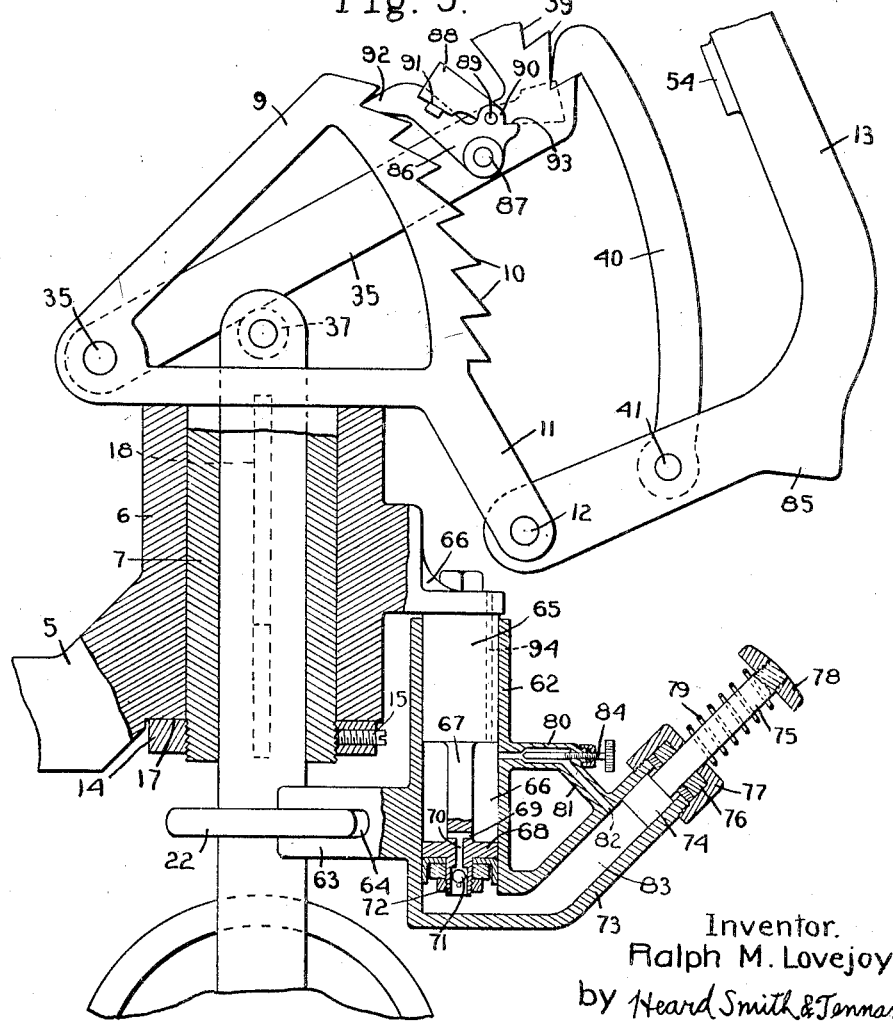

Patented June 12, 1923.

1,458,534

UNITED STATES PATENT OFFICE.

RALPH M. LOVEJOY, OF MEREDITH, NEW HAMPSHIRE, ASSIGNOR TO LEWIS-SHEPARD COMPANY, OF SOUTH BOSTON, MASSACHUSETTS, A CORPORATION OF MASSACHUSETTS.

ELEVATING TRUCK.

Application filed March 1, 1919. Serial No. 280,030.

*To all whom it may concern:*

Be it known that I, RALPH M. LOVEJOY, a citizen of the United States, and resident of Meredith, county of Belknap, State of New Hampshire, have invented an Improvement in Elevating Trucks, of which the following description, in connection with the accompanying drawing, is a specification, like characters on the drawing representing like parts.

This invention relates to improvements in elevating trucks which comprise a load supporting means and wheels and having means for elevating the load supporting means relatively to the wheels which include interengaging members operable by a handle, which preferably is the steering tongue and in which the descent of the load supporting means is controlled by a suitable cushioning device after the interengaging members have been disengaged and the means for locking the load supporting means in elevated position released.

One of the objects of the invention is to provide a more convenient means for releasing the interengaging members which are operated through the tongue or handle to elevate the load supporting means.

Another object of the invention is to provide an improved means for releasing the locking means which sustains the load supporting means in elevated position.

Another object of the invention is to provide means which may be operated after disengagement of the elevating means to raise the load supporting means sufficiently to release the locking means.

A further feature of the invention is to provide a novel fluid operated cushioning device in which the descent of the load supporting means may be regulated by a supplemental piston under the control of the operator and which may be operated manually or through the tongue of the truck.

Other objects and features of the invention will more fully appear from the following description and the accompanying drawings and will be pointed out in the annexed claims.

In the drawings:

Fig. 1 is a longitudinal view partly in vertical section of a preferred form of elevating truck embodying my invention, Fig. 2 is a plan view of the truck body showing the front extension of the load supporting means and steering head in section, Fig. 3 is an enlarged side elevation showing portions of the interengaging members which elevate the load supporting means, and one form of co-operating locking means for sustaining the load supporting means in elevated position, Fig. 3ª is a detail view showing the positions of the elevating mechanism when the load supporting means is in elevated position and the locking mechanism about to be released.

Fig. 4 is a similar view illustrating a different form of locking mechanism, and, Fig. 5 is an enlarged vertical sectional view through the front extension and steering head of a truck embodying the preferred form of my invention and also illustrating in vertical section a novel cushioning device for arresting the descent of the load supporting means, which is also operable to raise the load supporting means sufficiently to disengage the locking devices which retain it in elevated position.

The present invention contemplates the production of an elevating truck of novel and simple construction in which a load supporting means may be elevated relatively to the wheels upon which it is mounted by the swinging movement of a handle which preferably is the tongue of the truck, means being provided for locking the load supporting means in elevated position which may be readily released to permit the descent of the load.

In trucks of this character it has been customary to mount upon the steering mechanism a tongue capable of having a vertical swinging movement, interengaging means being connected to the load supporting means and the tongue which may be operated to raise the load supporting means to the desired elevation, in which position it is retained by a locking device. The interengaging means are then released to permit the tongue to be swung into steering position. The locking means for holding the load supporting means in elevated position have usually been in the form of a dog or hook pivoted upon one of the relatively movable members adapted to engage a hook or dog upon the other. The pressure imposed upon the dog by the weight of the load supporting means or the load thereupon makes it difficult to disengage the locking means unless the interengaging means are re-engaged and the load supporting means elevated sufficiently to release the pressure upon the locking means so that in the majority of cases it is necessary to re-engage the interengaging members and elevate the platform sufficiently to permit the release of the locking mechanism and thereafter to let down the load supporting means by a reverse movement of the handle or tongue from that used to elevate the load supporting means.

In the present invention a novel locking means is provided which may be easily released by the operator to permit the descent of the load thereby avoiding the necessity of re-engaging said members after the load supporting means has been raised to the desired height.

In the construction disclosed herein means are provided for elevating the load supporting means step by step and locking the same at each step of elevation so that in the use of the truck it is only necessary to raise the load supporting means the required distance to permit the free movement of the truck, the construction however, being such that the load supporting means may be raised to any desired height. Where means are thus provided for elevating the load supporting means step by step it is desirable that means be provided which will permit the descent of the load supporting means directly from any elevation which may have been given to it without the necessity of letting it down step by step. A cushioning device has therefore been provided which will gradually arrest the descent of the load supporting means.

A further feature of my invention contemplates providing means which will act through the cushioning device to relieve the pressure upon the locking mechanism so that different types of locking mechanism may be employed which heretofore have not been practical by reason of the difficulty inherent in releasing them when it was desired to deposit the load.

The preferred embodiment of my invention is shown in the accompanying drawings as applied to a truck having a load supporting means or platform 1, consisting of side rails 2 connected at their rear ends by a cross member 3 and at their front ends by a member 4 having a forward extension 5 provided with an upwardly extending cylindrical boss 6 which forms a journal for the steering head. The steering head comprises a cylindrical member 7 rotatably journalled in the boss 6 of the load supporting means and has upon its upper end an integral superstructure consisting of a member 8 resting upon the upper end of the boss 6 and a sector shaped member 9 which desirably may be of skeleton form and provided upon its curved end portion with a series of locking teeth 10. An arm 11 depending from the sector shaped member is provided at its lower end with a pivot 12 upon which a lever, preferably in the form of a tongue 13, is mounted. The lower end of the cylindrical member 7 of the steering head is provided with a nut 14 which is secured upon it by a set-screw 15 and engages the under face 17 of the forward extension 5 of the load supporting means.

A vertical post 16 is slidably mounted in the cylindrical member 7 of the steering head and prevented from rotation relatively to said cylindrical member by a feather 18. The steering post 16 is provided at its lower end with a forked portion 19 in which the steering wheel 20 is journalled upon a suitable shaft 21. It will however, be understood that a truck or any other form of steering device may be secured to the lower end of the steering post.

The steering post 16 is provided at a distance below the body of the load supporting means with a collar 22 which may be forged directly upon the steering post or suitably secured thereto. This collar serves upon longitudinal movement of said steering post relatively to the front end of the load supporting means to actuate mechanism for elevating the rear end of the load supporting means and also serves to support one of the members of the cushioning device which will hereinafter be more fully described.

In order to elevate the rear end of the load supporting means simultaneously with the elevation of the front end of said load supporting means as the steering post 16 is depressed a bell crank lever 23 is mounted in brackets 24 extending downwardly from the front end of the load supporting means and is operated to cause relative movement between the load supporting means and the rear wheels. One arm of the bell crank lever 23 is provided with a bifurcated end portion which embraces the collar 22. The other arm 25 of said bell crank lever is pivotally connected to a link 26 which extends longitudinally of and preferably midway of the platform and is connected at its rear end to the arm 27 of a bell crank lever which is pivoted upon a shaft 28 carried by brackets 29 depending from the rear end of the load supporting means.

The other arm 30 of the bell crank lever extends at an angle to the arm 27 and is provided with the boss 31 which forms a journal for a shaft 32 carrying the rear wheels 33, 34 of the truck. It will therefore be obvious that when the steering post 16 is forced downwardly relatively to the front end of the load supporting means the bifurcated end of the bell crank lever 23 will be depressed, causing the arm 25 of said bell crank lever to move forward, thus actuating the link 26 and causing it to draw forward the arm 27 of the bell crank lever which supports the rear end of the load supporting means thereby depressing the arm 30 thereof and causing an elevating movement of the rear end of the truck simultaneously with the upward movement of the front end thereof.

The relative movement between the steering post 16 and the load supporting means 1 is produced in the preferred embodiment of the invention disclosed herein by means of a lever which will be termed herein an elevating lever 35 which is pivotally mounted upon a stud 36 and which engages, at a short distance from its pivot or fulcrum, an antifriction roller 37 in the upper end of the steering post 16. The lever 35 desirably is actuated to produce the relative movements between the wheels and load supporting means by interengaging members upon or connected to said lever and to a handle or tongue.

In the present construction the lever 35 is provided with an arcuate extension 38 provided with teeth 39 corresponding to the ratchet teeth 10. The tongue 13 which is desirably in L-shaped form has a co-operating interengaging member or pawl 40 pivoted upon a stud 41 which is so located that when the load supporting means is in lowered position and throughout the elevating movements of the tongue the pawl will tend to fall by gravity into the teeth 39 at the end of the lever 35, but when the load supporting means is in its highest elevated position the pawl 40 will stand in a substantially vertical position.

It will be obvious that by repeated vertical swinging movement of the tongue the pawl 40 may be caused to engage successive teeth 39 in the end of the lever 35 and the load supporting means thereby raised step by step. In order to lock the load supporting means at each step of elevation a dog 42 is pivotally mounted upon the lever 35 and provided at one end with means engaging the teeth of the sector 10 and preferably at the other end with means adapted to be operated directly or indirectly by the movement of the tongue to disengage the dog.

In view of the difficulty ordinarily encountered in releasing the locking means in trucks of this character I have provided a novel form of dog in which the means which engage the ratchet is capable of a rotative movement relative to the teeth which are engaged by it. In Figs. 1 and 3 a locking dog is shown which consists of a body portion 42 which is pivoted upon a stud 43 upon the lever 35 and has at one end a member 44 pivotally connected to it by a stud 45 located at the lower portion of the end of said body 42. The member 44 is provided with a toothed end portion 46 which is adapted to engage the teeth of the locking ratchet 10 at the rear.

The toothed portion 46 merges into a curved portion 47 which is so constructed that when the pivoted member 44 is swung about the pivot 45 as the lock is released it will present a smooth curved portion which may be engaged by the teeth of the sector 10 during the relative movement between said sector and the lever 35 so that re-engagement will be prevented during the descent of the load supporting means.

A pin 48 projecting laterally from the body portion 42 of the locking dog serves to limit the movement of the pivoted member 44 in one direction and the edge 49 of said member is normally retained against the pin 48 by a helical spring 50 anchored to pins 51 and 52 upon the body portion and pivoted member respectively of the locking dog. The pin 48 is so positioned as to retain the pivoted member 44 in such position that a line connecting the end of the tooth 46 with the pivot 43 will extend slightly above the pivot 45 by which the member 44 is connected to the body portion of the dog. By this construction a jointed dog is provided in which the pressure exerted between the lever 35 and the locking rack 10 will serve to stiffen the dog while the joint may be easily broken by pressure upon the opposite end of the body portion of the dog. The relation of the pivots 43 and 45 are such that when pressure is imposed between the lever 35 and the locking ratchet 10 the dog is caused to have a tendency to rotate in counterclockwise direction so that the toothed end 46 of the dog and the teeth of the ratchet 10 are held in engagement.

In order to release the dog the body portion 42 may be conveniently provided with an extension or tail 53 which may be positioned to engage the pawl 40 which is carried by the tongue 13 as the tongue is raised when the lever 35 is at its lowermost position and the load supporting means consequently in elevated position.

By reason of this construction the raising of the tongue 13 when the load supporting means is in elevated position will first cause the pawl 40 to engage the tail 53 of the dog, and release the pawl 40 from engagement with the teeth 39 of the lever 35 thereby causing the pawl to rock backward until it rests against a boss 54 which may be provided upon the tongue. This action is permitted because the jointed dog is held in locking position by the weight of the load, while the pawl 40 is free from the weight of the load, so that the pawl 40 may be thus removed from engagement with the teeth 39 of the lever 35 without actuating the jointed dog.

The jointed locking dog may be broken by further upward and rearward swinging movement of the tongue in the following manner. When the tongue is swung upwardly as before described to substantially vertical position the upper end of the pawl 40 rests against the lug 54 upon the tongue and the lower portion of the pawl is engaged by the tail 53 of the body portion 42 of the jointed locking dog. By swinging the tongue still further upwardly, or in fact rearwardly, the lower end portion of the pawl 40 is caused to press against the tail 53 of the dog so that the body portion 42 thereof is swung about its pivot 43. The toothed portion 46 of the jointed dog is pivotally mounted upon the body portion by the pivot 52 so that during the swinging movement of the body portion 42 about its pivot 43 the pivot 45 is swung upwardly in the arc of a circle about the pivot 43. As the end of the toothed dog 46 is engaged by a tooth of the ratchet 10 and is held substantially stationary the arcuate movement of the pivot 45 causes the toothed end portion of the locking dog to swing about the pivot 45 so that the locking dog is broken as soon as the pivot 45 is carried above a line passing through the pivot 43 and the sharp end of the portion 46, thereby permitting the curved portion 47 of the end portion of the dog to rest upon the ratchet and slide over the teeth thereof as the platform descends. In this action the jointed locking dog 42 and 46 is in effect a toggle which, when in locking position, is rigid, but which is broken when the tail of the dog is pressed rearwardly by the tongue.

A modified form of dog mechanism having a rotatable member engaging the teeth of the ratchet is illustrated in Fig. 4. In this construction a dog 55 is pivotally mounted upon a stud 56 upon the lever 35 and is provided at its end with a roller 57 pivotally mounted upon a stud 58 in the end of said dog 55. The roller 57 engages teeth 59 which preferably are curved in contour and present rounded ends 60 which are not easily broken off. In this construction as in that illustrated in Fig. 1 the dog 55 is provided with a tail 61 which is adapted to be engaged by the pawl 40 on the tongue when the load supporting means is in elevated position, so that pressure produced by the raising of the tongue together with a rearward swinging movement thereof, through the pawl 40, upon the tail 61 of the dog will serve to remove the end of the dog from locking engagement with the ratchet, the roller 57 rolling up the inclined face of the tooth of the locking rack.

In order to relieve the pressure between the members of the locking device so that the latter may be readily released, whether said locking device is of the character above described or a different form of pawl, means may be provided independent of the elevating mechanism for moving the load supporting means sufficiently to release the pressure between the members of the locking device, such means preferably acting through the cushioning means which gradually arrests the descent of the load supporting means. In the preferred embodiment of the invention disclosed herein the cushioning means is in the form of a dash pot comprising a cylinder 62 having a rearward extension 63 which has a slot or bifurcation 64 to embrace the collar 22 upon the steering post and a co-operating piston 65 carried by a bracket 66 which is secured to or formed integral with the front of the extension 5 of the load supporting means in which the steering head is journalled.

The piston 65 preferably is chambered to provide a fluid receptacle and the head of the piston is provided with a valve-controlled port through which the fluid in the piston chamber may flow freely into the cylinder as the piston is raised, while the fluid is caused to flow from the cylinder into the piston chamber through a restricted by-pass as the piston descends under the weight of the load.

In the preferred embodiment of the invention disclosed herein the body of the piston 65 is provided with an extension or stem 67 by which it is connected to a lower head 68 leaving an intermediate annular chamber 66 of the character specified. A port 69 in the stem 67 communicates with a port 70 located preferably centrally of the lower head 68 and leads to the lower portion of the cylinder. The port 70 is controlled by a ball valve 71 which is secured within a cage 72 and which operates upon the descent of the piston to close the port 70 and upon elevation of the piston to permit the liquid to flow freely from the piston chamber into the lower portion of the cylinder. The lower portion of the cylinder 62 is provided with a tubular extension 73 which preferably is inclined upwardly. A supplementary piston 74 is mounted in the extension 73 and is provided with a stem 75 extending through a suitable packing gland 76 having a cap 77 secured upon the end of said tubular extension.

The piston stem 75 has at its outer end a knob 78 adapted to be operated by the foot of the operator or by the tongue as will hereinafter be described. The piston is normally retained in retracted position by a helical spring 79 which surrounds the piston stem 75 and abuts at one end against the cap 77 and at its other end against the knob 78.

A conduit having a horizontal portion 80 and an inclined portion 81 provides a by-pass 82 connecting the piston chamber 66 with the chamber 83 of the extension 73. The area of this by-pass may conveniently be controlled by a needle valve 84 located in the horizontal portion 80 of the conduit. The port 82 preferably is so located in the extension 73 that the piston 74 may be caused to pass by it by pressure upon the knob 78, thus the piston may be adjusted to control the port 82 of the by-pass or may be forced across it to close the by-pass entirely so that the entire force exerted upon the piston 74 will bear upon the fluid in the cylinder beneath the piston head 68.

In the operation of this mechanism as a cushioning device to arrest the descent of the load supporting means and its load the descent of the piston 65 first causes the valve 71 to close the port 70, after which the descent of the piston is controlled by the rate of flow of the fluid from the extension 83 of the cylinder through the restricted by-pass 81 into the piston chamber 66.

When the load supporting means is raised the ball valve 71 falls from its seat so that the fluid flows freely from the piston chamber 66 through the ports 69 and 70 into the lower portion of the cylinder.

If the operator desires to arrest the descent of the load at any point it may be accomplished by forcing down the supplemental piston 74 until it closes the port 82. The operator may then gradually release the pressure upon the head 78 of the supplemental piston and permit the load to descend as gradually as desired.

This mechanism may also be utilized to cause a slight elevation of the load supporting means sufficient to relieve the pressure between the members of the locking device. If the operator presses smartly upon the head 78 of the supplemental piston the piston will be forced beyond the port 82 and will exert a pressure upon the under face of the lower cylinder head thereby hydraulically raising the plunger 65 and with it the load supporting means.

The pressure upon the head 78 of the supplemental piston may be made by the foot of the operator and also may conveniently be produced by a downward movement of the tongue.

In the construction illustrated in Figs. 1 and 5 the tongue is shown as having a boss 85 which is positioned to engage the head 78 of said supplemental piston when the tongue is pressed downwardly a sufficient distance. By this means a powerful pressure may be applied by the supplemental piston which will enable it to raise the load supporting means a considerable distance and also will permit a steady control of the load supporting means during its descent.

By using a supplemental mechanism such as that above described for elevating the load supporting means to release the locking mechanism other types of locking mechanism than that above described may be utilized. For example a counterbalanced dog may be secured to the elevating lever and so arranged that the counterbalancing means will hold the dog in engagement with the co-operating locking member during the elevating movement, said counterbalancing means being thereafter shifted manually or automatically to cause the dog to be released when pressure between it and its co-operating locking member is relieved.

Such an automatic dog operated mechanism is illustrated in Fig. 5 in which a dog 86 is pivotally mounted upon a stud 87 upon the elevating lever 35. A counterweight 88 is pivotally mounted upon a stud 89 in an upwardly extending ear 90 upon said dog and may be positioned to rest against the upper face 91 of said dog thereby normally forcing the toothed end 92 of the dog into engagement with the teeth of the locking ratchet 10. The dog 86 is provided with a shoulder 93 upon the opposite side of the pivot 87 which will engage and support the counterweight 88 when it is swung to that side of its pivot 89.

In the operation of the device therefore the counterweight 88 will normally be placed in the position shown in full lines in Fig. 5 so that the tooth 92 of the dog will be in position to engage successive teeth upon the locking rack, when the load supporting means has been raised to its desired elevation the counterweight 88 may be thrown to the position indicated in dotted lines whereupon it will act to throw the dog out of engagement with the locking ratchet when the load supporting means is elevated by the supplemental elevating mechanism sufficiently to relieve the pressure between the dog and the locking rack.

It will be understood that the embodiment of the invention disclosed herein is illustrative in character and is not restrictive and that various modifications in design, form and arrangement of parts may be made within the meaning and scope of the following claims.

Having thus described my invention what I claim as new and desire to secure by Letters Patent is:

1. In an elevating truck comprising wheels and load supporting means, means for elevating said load supporting means relatively to said wheels including an elevating lever, a handle, interengaging members connecting said handle and lever operable when the handle is moved in one direction to actuate said elevating lever, locking means for holding the load supporting means in elevated position including a dog pivotally mounted upon said elevating lever and a co-operating member, and means operable by movement of the handle in the opposite direction to release said dog from its engagement with said co-operating locking member.

2. In an elevating truck comprising wheels and load supporting means, means for elevating said load supporting means relatively to said wheels including an elevating lever, a handle, interengaging members connecting said handle and lever operable when the handle is moved in one direction to actuate said elevating lever, locking means including a dog receiving member, a co-operating dog pivotally mounted upon said lever and having a pivoted member engaging said dog receiving member.

3. In an elevating truck comprising wheels and load supporting means, means for elevating said load supporting means relatively to said wheels including an elevating lever, a handle, interengaging members connecting said handle and lever operable when the handle is moved in one direction to actuate said elevating lever, locking means including a ratchet and a co-operating dog pivotally mounted upon said elevating lever and having a pivotally mounted ratchet-engaging member and means operable by the movement of the handle in the opposite direction to that for elevating to disengage said dog from said ratchet.

4. In an elevating truck comprising wheels and load supporting means, means for elevating said load supporting means relatively to said wheels including an elevating lever, a handle, interengaging members connecting said handle and lever operable when the handle is moved in one direction to actuate said elevating lever, locking means including a ratchet, a dog pivoted upon said elevating lever and having at one end a pivotally mounted ratchet-engaging member and upon its other end an extended tail positioned to be engaged by said handle upon movement of the handle in the opposite direction to that of elevating whereby said movement of the handle may be caused to disengage said dog from said ratchet.

5. In an elevating truck comprising wheels, load supporting means and a steering head having a tongue mounted thereon to swing vertically, elevating means including an elevating lever fulcrumed on said head, a pawl pivotally mounted upon said tongue adapted upon raising the tongue, when the platform is lowered, releasably to engage said elevating lever and upon depression to actuate said elevating lever, locking means including a dog pivotally mounted upon said elevating lever having a member positioned to be engaged by said pawl when the tongue is raised with the load supporting means locked in elevated position so that a further raising of the tongue will release said pawl.

6. In an elevating truck comprising wheels, load supporting means and a steering head having a tongue mounted thereon to swing vertically, elevating means including an elevating lever having pawl-receiving recesses fulcrumed on said head, a pawl pivotally mounted on said tongue adapted upon raising the tongue when the platform is lowered releasably to engage a recess in said elevating lever and upon depression to actuate said elevating lever, locking means including a ratchet on said steering head and a co-operating jointed dog pivotally mounted upon said elevating lever and provided with a tail, positioned to engage said pawl when the tongue is raised with the load supporting means locked in elevated position, said tail being so disposed that further raising of said tongue will cause said pawl to break the joint of said dog and release the same from locking engagement with said ratchet.

7. In an elevating truck comprising wheels, load supporting means and a steering head having a tongue pivotally mounted thereon to swing vertically, step by step elevating means including an elevating lever fulcrumed upon said steering head and having a toothed free end, means carried by said tongue adapted to engage successive teeth on said elevating lever upon repeated vertical swinging movements of the tongue and co-operating locking means upon said elevating lever and steering head.

8. In an elevating truck comprising wheels, load supporting means and a steering head having a tongue pivotally mounted thereon to swing vertically, step by step elevating means including an elevating lever fulcrumed upon said steering head and having a toothed free end, a ratchet on said steering head, a dog on said lever engaging said ratchet, a pawl on said tongue adapted to engage successive teeth of said elevating lever upon repeated swinging movements of the tongue and means operable by said tongue for releasing said dog.

9. In an elevating truck comprising wheels, load supporting means and a steering head having a tongue pivotally mounted thereon to swing vertically, step by step elevating means including an elevating lever fulcrumed upon said steering head and having a toothed free end, a pawl pivotally mounted on said tongue adapted upon raising the tongue when the load supporting means is in lowered position and during the elevating movements to engage the teeth of said elevating lever, means for locking said load supporting means at each step of elevation and means operable upon raising the tongue when the load supporting means is locked in a predetermined elevated position to disengage said pawl from said lever.

10. In an elevating truck comprising load supporting means, wheels and means for elevating the load supporting means relatively to said wheels, and mechanical interengaging means for locking said load supporting means in elevated position; means for cushioning the descent of the load and supplemental means independent of the elevating means for raising said load supporting means to remove the pressure between said interengaging locking members whereby said members may be easily released to permit the load supporting means to descend.

11. In an elevating truck comprising load supporting means, wheels and means for elevating the load supporting means relatively to said wheels, and mechanical interengaging means for locking said load supporting means in elevated position; means for cushioning the descent of the load and manually operable means acting through said cushioning means to relieve the pressure imposed upon said locking means whereby the locking means may be easily released to permit the load supporting means to descend.

12. In an elevating truck comprising load supporting means, wheels and means for elevating the load supporting means relatively to said wheels, and mechanical interengaging means for locking said load supporting means in elevated position; fluid operated means for cushioning the descent of the load and manually operable means acting through said cushioning means to raise the load supporting means to relieve the pressure imposed upon the interengaging locking means whereby said locking means may be readily released to permit the platform to descend.

13. In an elevating truck comprising wheels, load supporting means and means for elevating the same relatively to said wheels; fluid operated mechanism for cushioning the descent of the load supporting means, including a fluid containing cylinder and piston and a supplemental piston operable to control the action of the fluid in said cylinder.

14. In an elevating truck comprising wheels, load supporting means and means for elevating the same relatively to said wheels, fluid operated mechanism for cushioning the descent of the load supporting means, including a fluid containing cylinder having an extension, a main piston in said cylinder and a supplemental piston in said extension manually operable to cause said main piston to raise the load supporting means and also operable to control the descent of said load supporting means.

15. In an elevating truck comprising wheels, load supporting means and means for elevating the same relatively to said wheels and means for locking the load supporting means in elevated position, fluid operated mechanism for cushioning the descent of the load supporting means including a fluid containing cylinder having at its lower end an extension, a chambered main piston in said cylinder having at its lower end a valve adapted to close upon descent of said piston, a by-pass connecting said piston chamber to said extension and means for varying the area of said by-pass whereby the descent of the main piston may be regulated and a piston in said extension operable to raise the load supporting means whereby the locking mechanism may be readily released.

16. In an elevating truck comprising wheels, load supporting means and means for elevating the same relatively to said wheels; fluid operated mechanism for cushioning the descent of the load supporting means including a fluid containing cylinder having at its lower end a tubular extension, a chambered main piston in said cylinder, a valve in the lower head of said piston adapted to close upon descent of said piston, a by-pass connecting said piston chamber to said extension and a supplemental piston in said extension reciprocable across the port of said by-pass in said extension whereby said supplemental piston is operable to control the flow of fluid through said by-pass and also to act upon the fluid in said cylinder beneath said main piston.

17. In an elevating truck comprising wheels, load supporting means and swinging mechanism having a vertically swinging tongue mounted thereon, elevating means operable by the vertical swinging movement of said tongue, means for locking the load supporting means in elevated position, means for cushioning the descent of the load supporting means and means operable by said tongue through said cushioning means to raise said load supporting means sufficiently to permit the disengagement of said locking means.

18. In an elevating truck comprising wheels, load supporting means and steering mechanism including a tongue mounted to swing vertically, elevating means including inter-engaging means pivotally mounted respectively upon said load supporting means and said tongue, locking means and means for cushioning the descent of said load supporting means including a cylinder having at its lower end a tubular extension, a chambered piston in said cylinder, a by-pass connecting the chamber of said piston with said extension, a supplemental piston in said extension adapted to be engaged by said tongue and operated thereby to raise the load supporting means sufficiently to release the locking means and operable by said tongue to control the descent of the load supporting means.

In testimony whereof, I have signed my name to this specification.

RALPH M. LOVEJOY.